May 21, 1940.  J. HUBER  2,201,681
WEDGE FOR SECURING HAMMER HEADS OR THE LIKE TO THEIR SHAFTS
Filed Aug. 9, 1938
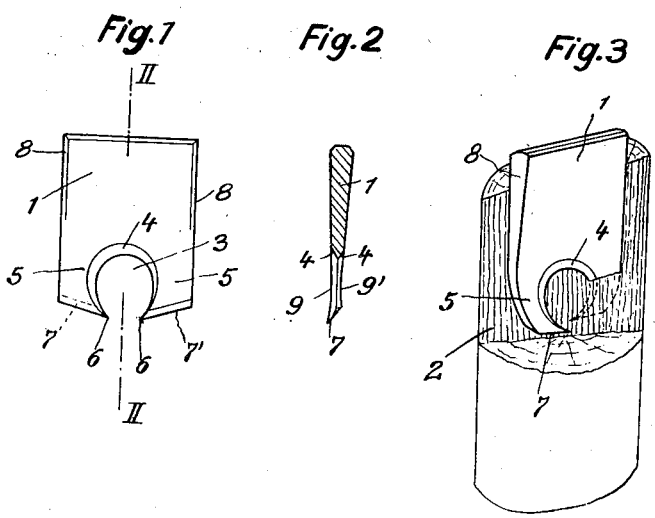
Inventor
JAKOB HUBER
By  Walter S. Bleistein
Attorney Patented May 21, 1940

2,201,681

UNITED STATES PATENT OFFICE 2,201,681

WEDGE FOR SECURING HAMMER HEADS OR THE LIKE TO THEIR SHAFTS

Jakob Huber, Tuttlingen, Germany

Application August 9, 1938, Serial No. 223,812
In Germany August 13, 1937

3 Claims. (Cl. 306—33)

This invention relates to a wedge for fixing the heads of hammers and the like to their shafts.

For fixing the shaft of a hammer to its head it is known to use a wedge of which the thinner end merges into two strips or legs which are provided at their outer ends with oppositely bevelled cutting edges, so that, when the wedge is driven in, the flaps are curved in opposite directions and thereby hold the wedge firmly in position.

In the wedge of the present invention, the inner side edges of the strips or legs do not run substantially parallel to one another or converge towards the wide end of the wedge as was previously the case, but instead of this the legs are provided at their outer ends with inwardly directed claw-like points or prongs in addition to the bevelled cutting edges. Further, the thickness of the claw-like legs is reduced adjacent the cutting edges in the manner of a hollow-ground knife. Also the bevelled cutting edges of the legs of the wedge do not run at right angles to the side edges of the wedge but are inclined obliquely downwards relatively to the side edges.

Preferably, the claw-like prongs are formed by providing the wedge at its thinner end with an aperture or recess which may be approximately circular or oval but which in any case decreases in size towards the thinner end of the wedge. The edge of this aperture is bevelled on both sides like the cutting edge of a knife.

When a wedge which is formed in this manner is driven into the shaft of a hammer or the like, even if the thickness of the wedge is considerable, the flaps bend over laterally owing to the hollowing on both sides. Further the inwardly directed prongs form additional hooks which assist in holding the wedge firmly in the wood in addition to the bending of the legs. The wedges therefore, as distinguished from the known wedges, are doubly secured. Further, the new shape of the legs has the result that, when the wedge is driven into the shaft, the legs do not only bend over towards opposite sides but, owing to the oblique cutting edges of the legs, the claws are also given a twist and fold over towards the centre of the wooden shaft.

Again, owing to the round shape of the aperture and its sharpened edges on both sides the wood of the shaft penetrates into the aperture and substantially fills it, which is another circumstance which contributes towards the security of the wedge.

A fastening wedge constructed in accordance with the invention is illustrated by way of example in the accompanying drawing, in which:

Figure 1 is a front elevation of the wedge.

Figure 2 is a section on the line II—II of Fig. 1, and

Figure 3 is a perspective view through the shaft of the hammer showing the wedge driven into position.

Referring to the drawing, the spreading power of the wedge 1 is considerable so as to produce a firm hold of the wooden shaft in the head of the hammer. At the thinner end of the wedge there is an approximately circular aperture 3, the edge 4 of which is bevelled off or chamfered on both sides, so that two legs 5 having oppositely directed pointed claws 6 are formed. The lower edges 7, 7' of the legs are bevelled on opposite sides. The cutting edges 7, 7' also run obliquely to the sides of the wedge whereby the penetrating power of the legs into the wood of the shaft is increased and distortion of the legs in the plane of the wedge is caused to take place; this increases the hold of the wedge on the wood of the shaft and almost entirely precludes the possibility of the wedge becoming loose. The surfaces 9, 9' of the legs above the cutting edges 7, 7' are hollowed so that on the one hand the cutting edges are undercut and the wedge can be driven in more easily, while on the other hand the legs will also bend more easily.

The wedge in accordance with the invention holds the head of the implement extremely firmly. It may however happen that, owing to contraction of the wood of the shaft, the shaft comes loose in the bore of the hammer or other tool. In this case the wedge need merely be driven further into the shaft.

I claim:

1. A wedge for fastening an implement to a shaft, said wedge comprising two legs at its thinner end, the free ends of said legs having oppositely bevelled cutting edges respectively, and inwardly directed claw-like prongs formed by a recess between said legs, the width of said recess between said legs decreasing towards the ends of said prongs, the inner edge of said recess being knife-like bevelled from both sides, and the cutting edges of the legs being inclined, downwardly and inwardly, to the respectively adjoining side faces of the wedge.

2. A wedge as claimed in claim 1 in which the parts of the legs adjacent said cutting edges are reduced in thickness in the manner of a hollow ground knife.

3. A wedge for fastening an implement to a shaft comprising a body having a recess open at one end edge of said body and converging towards said open end to form legs of said body with opposed claw-like prongs at their free ends, the entire periphery of said recess being a continuous curve and bevelled inwardly on both sides to form a cutting edge continuous from the point of one of said end prongs to the point of the other prong, said prongs being bevelled on opposite sides respectively to form other cutting edges, said other cutting edges being inclined transversely of said body so that the adjacent ends of said other cutting edges project farther from the opposite end edge of the body than the other ends of said other cutting edges.

JAKOB HUBER.